Feb. 8, 1944.    E. C. DIETZ    2,340,941
BURRING ATTACHMENT FOR DRILLS
Filed July 1, 1943

INVENTOR.
Elmer C. Dietz
BY
Ivan E. A. Konigsberg
Atty.

Patented Feb. 8, 1944

2,340,941

UNITED STATES PATENT OFFICE 2,340,941

BURRING ATTACHMENT FOR DRILLS

Elmer C. Dietz, Richmond Hill, N. Y.

Application July 1, 1943, Serial No. 493,065

4 Claims. (Cl. 77—66)

The object of this invention is to provide a burring attachment for drills which is characterized by a simple inexpensive construction which does not include any specially made chucks or other elaborate devices for securing the cutting tool to the drill. The invention is embodied in such a simple practical and efficient device that it may be made and used with a minimum of expenditure of material and labor. In the accompanying drawing illustrating the invention Fig. 1 is a side view of the attachment.

Figure 1:
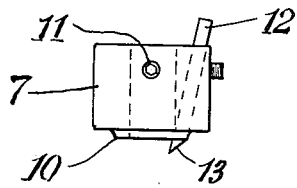
Figure 4:
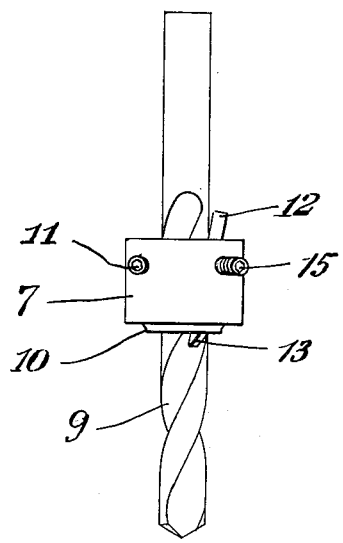
Fig. 4 shows the burring attachment mounted in operative position on a drill.
Figure 2:
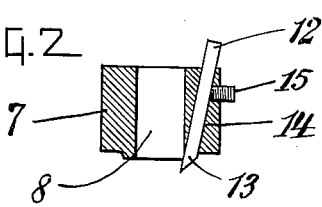
Fig. 2 is a central vertical sectional view thereof.
Figure 3:
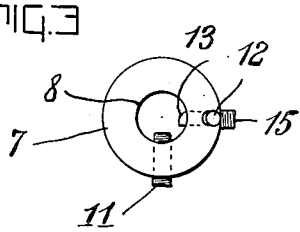
Fig. 3 is a plan view.

The burring attachment according to this invention consists of a tool holder 7 which is nothing but a short piece of tubing cut to a suitable length. It may be cut from a standard sized tubing so that the hole 8 will fit standard size drills. While this involves having a graded set of attachments to fit graded sets of drills, this is not believed to be a disadvantage because it is quite common to have graded sets of tools for different purposes. Then again, the attachment is so quickly made that different sizes can be made from time to time and thus after a while be collected into a complete set.

The bottom of the holder may be formed with a reaming head 10 for smoothing the edge of the drilled hole after the burr has been removed if it should be desired. The head 10 also serves as a centering device. The tool 12 for cutting away the burr from the edge of a drilled hole is made from a standard size rod and is then ground at any desired angle to form the cutter 13. A hole 14 is drilled through the holder at an angle to its central axis. The tool is inserted into the hole and held in adjusted position by a set screw 15. The tool 12 projects above the holder to form a gripping portion as shown for convenience in adjusting the tool.

When a burr is to be removed the attachment is pushed from below into position on the drill, the cutter 13 following the groove in the drill like a screw being screwed on as will be understood. When the cutter 13 is at the proper height the set screw 15 is tightened and the tool is ready to be used. As the drill is rotated the cutter 13 is lowered onto the drilled hole and cuts the burr at the upper edge of the hole. The reaming head 10 further smoothes the edge.

Figure 5:
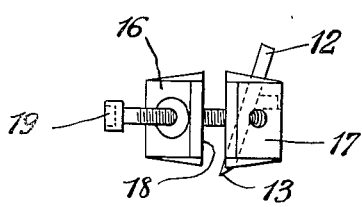
Figs. 5 and 6 illustrate a modification in side view and plan view, respectively.
Figure 6:
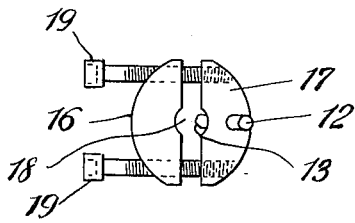

Figs. 5 and 6 show a burring attachment in which the holder is made in two halves 16 and 17 whereby the central bore 18 is adjustable to fit drills of different diameters. Set screws 19, 19 serve to clamp the holder to the drill. The tool 12 with cutter 13 is similar to that described above.

The attachment as herein disclosed is characterized by extreme simplicity and low cost of manufacture. It may be quickly made from standard size pieces in a machine shop. The tool cutter is easily adjusted to the proper cutting height because the cutter 13 is visible at all times and the operator takes hold of the upper projecting end of the tool 12 in making the adjustment.

I claim:

1. A burring attachment for drills comprising a holder having a central bore clear through the same adapted to receive the drill, a set screw in the holder for adjustably and detachably securing the attachment to the drill, said holder having a bore passing clear through the holder and inclined at an angle to the axis of the holder towards the bottom thereof, a tool in said inclined bore and a set screw in the holder for adjustably and detachably securing the tool in the holder, the bottom of said tool forming a cutter below said holder and adapted to project into the groove of the drill.

2. A burring attachment according to claim 1 including a tool of greater length than the said inclined bore, the upper end of the tool projecting above the said holder to form a gripping portion to facilitate the adjustment of the cutter formed on said tool.

3. A burring attachment according to claim 1 including a reaming head on the bottom of the said holder.

4. A burring attachment for drills comprising a holder having a central bore clear through the same for attachment to a drill, screw means in said holder for securing the same to the drill, a bore in said holder inclined towards the axis of the holder at the bottom thereof, a cutting tool in said inclined bore and projecting at both ends thereof and a set screw for securing said cutting tool in the said inclined bore in axial adjustable relation to the said holder.

ELMER C. DIETZ.